United States Patent
Premi (10) Patent No.: US 10,529,315 B2
(45) Date of Patent: Jan. 7, 2020

(54) SYSTEM AND METHOD FOR TEXT TO SPEECH CONVERSION OF AN ELECTRONIC DOCUMENT

(71) Applicant: Wipro Limited, Bangalore (IN)

(72) Inventor: Dhruv Premi, Bangalore (IN)

(73) Assignee: Wipro Limited, Bangalore (IN)

( * ) Notice: Subject to any disclaimer, the term of this patent is extended or adjusted under 35 U.S.C. 154(b) by 121 days.

(21) Appl. No.: 15/723,412

(22) Filed: Oct. 3, 2017

(65) Prior Publication Data

US 2019/0057682 A1 Feb. 21, 2019

(30) Foreign Application Priority Data

Aug. 17, 2017 (IN) .............................. 201741029165

(51) Int. Cl.
| | | |
|---|---|---|
| *G10L 13/08* | (2013.01) | |
| *G10L 13/04* | (2013.01) | |
| *G10L 13/00* | (2006.01) | |
| *G06F 17/21* | (2006.01) | |

(52) U.S. Cl.
CPC ............ *G10L 13/08* (2013.01); *G06F 17/212* (2013.01); *G10L 13/00* (2013.01); *G10L 13/04* (2013.01)

(58) Field of Classification Search
CPC ................................................... G10L 13/08
USPC ....................................................... 704/260
See application file for complete search history.

(56) References Cited

U.S. PATENT DOCUMENTS

| | | | | |
|---|---|---|---|---|
| 9,472,113 | B1* | 10/2016 | Hwang ................. | G09B 5/062 |
| 9,715,873 | B2* | 7/2017 | Graham ................ | G10L 13/033 |
| 2009/0089058 | A1* | 4/2009 | Bellegarda ............ | G06F 17/277 |
| | | | | 704/251 |
| 2011/0050594 | A1* | 3/2011 | Kim ..................... | G06F 3/04847 |
| | | | | 345/173 |
| 2014/0026055 | A1* | 1/2014 | Cohn .................... | G06F 3/0482 |
| | | | | 715/727 |
| 2014/0337033 | A1* | 11/2014 | Kim ....................... | A61H 3/061 |
| | | | | 704/260 |
| 2018/0046331 | A1* | 2/2018 | Monson .................. | G10L 13/10 |

OTHER PUBLICATIONS http://valeriobasile.github.io/presentations/CLIN2013.pdf, "A General-Purpose Machine Learning Method for Tokenization and Sentence Boundary Detection" (2013).

* cited by examiner

*Primary Examiner* — Jakieda R Jackson
(74) *Attorney, Agent, or Firm* — Pepper Hamilton LLP (57) ABSTRACT

The present disclosure relates to methods, non-transitory computer readable media, and devices for text-to-speech conversion of electronic documents. An electronic document comprising one or more pages comprising a plurality of characters and a plurality of first segments is received. The plurality of characters is segmented into a plurality of second segments based on first metadata associated with the plurality of characters. A first relationship between each of the plurality of second segments is identified based on the first metadata associated with the plurality of characters, second metadata associated with the plurality of first segments, and spatial information associated with the plurality of segments. A reading sequence of the electronic document is determined based on the first relationship. An audio is then generated based on the reading sequence of the electronic document.

12 Claims, 5 Drawing Sheets

FIG. 5: Example Computer System

SYSTEM AND METHOD FOR TEXT TO SPEECH CONVERSION OF AN ELECTRONIC DOCUMENT

This application claims the benefit of Indian Patent Application Serial No. 201741029165, filed Aug. 17, 2017, which is hereby incorporated by reference in its entirety.

FIELD

This disclosure relates generally to text to speech conversion and more particularly to a system and method for text to speech conversion of an electronic document based on reading sequence of the electronic document.

BACKGROUND

Audio readers of electronic documents are essentially text to speech converters that are presently used to read out electronic documents such as Portable Document Format (PDF) documents. However, presently, the user needs to give as an input, a preferred reading sequence such as left to right or top to bottom. Also, presently, the audio readers are not able to identify the relationship between words while reading it out. Further, the audio readers fail to intuit the presence of a table while reading out the content in the reading sequence.

Hence there arises need for a device that can identify relationship between words in the electronic document, intuit presence of a table, determine reading sequence and read out loud the electronic document with the reading sequence as a reference.

SUMMARY

In an embodiment, the present disclosure illustrates a method of text to speech conversion of an electronic document. The method comprising receiving the electronic document comprises one or more pages, the one or more pages comprising plurality of characters and plurality of line segments. The method further comprising segmenting the plurality of characters into a plurality of segments based on metadata associated with the plurality of characters. The method further comprising identifying a relationship between each of the plurality of segments based on the metadata associated with the plurality of characters, metadata associated with the plurality of line segments and spatial information associated with the plurality of segments. The method further comprising determining a reading sequence of the electronic document based on the relationship. The method further comprising generating an audio based on the reading sequence of the electronic document.

In another embodiment, the present disclosure illustrates a system for text to speech conversion of an electronic document. The system comprises a processor and a memory communicatively coupled to the processor. The memory stores processor instructions, which, on execution, causes the processor to receive the electronic document, wherein the electronic document comprises one or more pages, the one or more pages comprising plurality of characters and plurality of line segments. The processor further segments the plurality of characters into a plurality of segments based on metadata associated with the plurality of characters. The processor further identifies a relationship between each of the plurality of segments based on the metadata associated with the plurality of characters, metadata associated with the plurality of line segments and spatial information associated with the plurality of segments. The processor further determines a reading sequence of the electronic document based on the relationship. The processor further generates an audio based on the reading sequence of the electronic document.

In yet another embodiment, a non-transitory computer readable storage medium is provided. The storage medium stores a program that, when executed by a computer, cause the computer to perform a method of text to speech conversion of an electronic document. The method comprises receiving the electronic document comprises one or more pages, the one or more pages comprising plurality of characters and plurality of line segments. The method further comprising segmenting the plurality of characters into a plurality of segments based on metadata associated with the plurality of characters. The method further comprising identifying a relationship between each of the plurality of segments based on the metadata associated with the plurality of characters, metadata associated with the plurality of line segments and spatial information associated with the plurality of segments. The method further comprising determining a reading sequence of the electronic document based on the relationship. The method further comprising generating an audio based on the reading sequence of the electronic document.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter discloses a system and method for text to speech conversion of an electronic document. The system and method may be implemented in a variety of computing systems.

Working of the systems and methods for text to speech conversion of an electronic document is described in conjunction with FIG. 1-5. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

Figure 1:
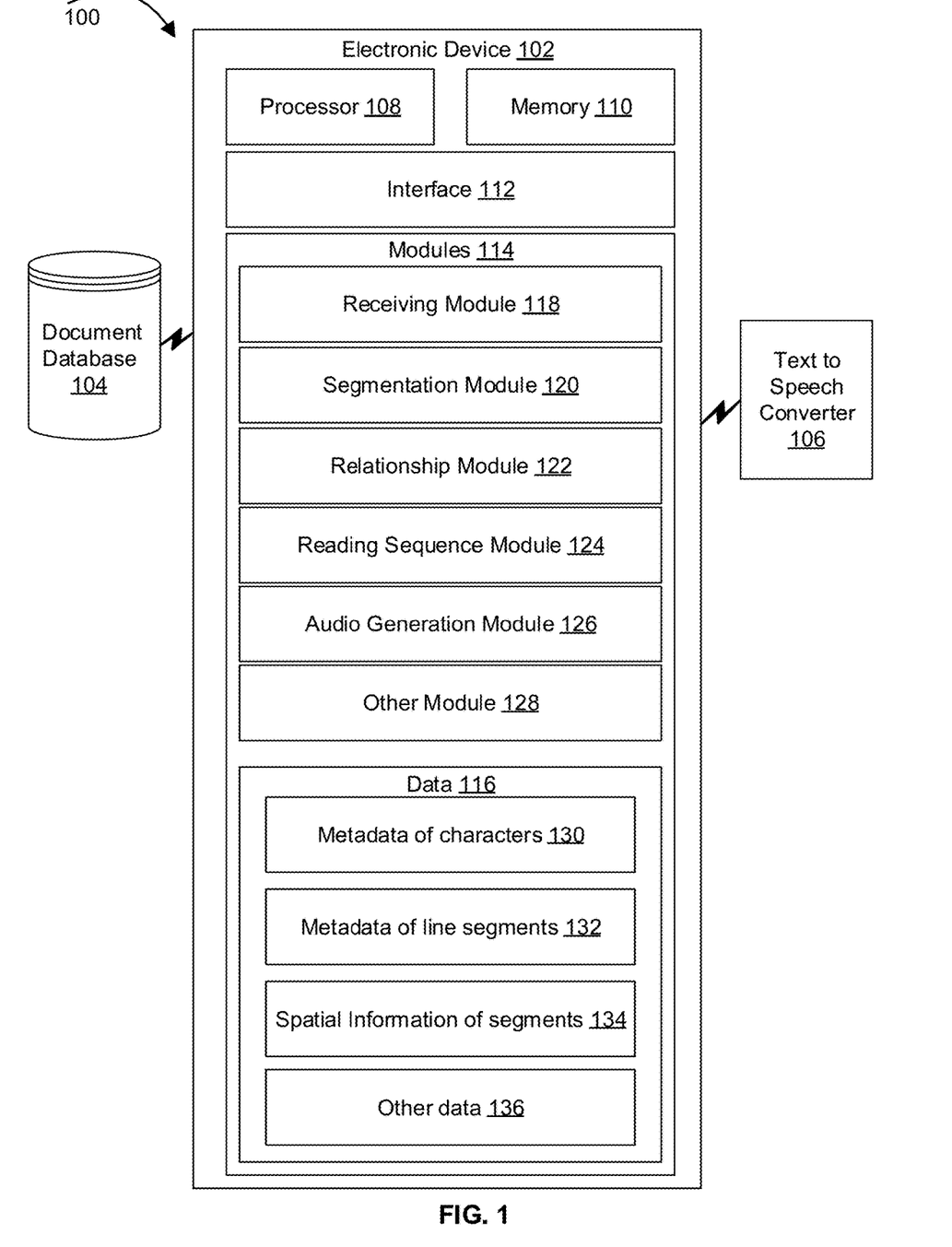
FIG. 1 illustrates an exemplary network implementation comprising an electronic device for text to speech conversion of an electronic document, according to some embodiments of the present disclosure.

FIG. 1 illustrates an exemplary network environment 100 comprising an electronic device 102, in accordance with some embodiments of the present disclosure. As shown in FIG. 1, the electronic device 102 is communicatively coupled to a document database 104 and a text to speech converter 106. Although the document database 104 and the text to speech converter 106 is shown external to the electronic device 102 in FIG. 1, it may be noted that, in one implementation, the document database 104 and the text to speech converter 106 may be present within the electronic device 102.

The electronic device 102 may be communicatively coupled to the document database 104 and the text to speech converter 106 through a network. The network may be a wireless network, wired network or a combination thereof. The network can be implemented as one of the different types of networks, such as intranet, local area network (LAN), wide area network (WAN), the internet, and such. The network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network may include a variety of network devices, including routers, bridges, servers, computing devices, storage devices, etc.

As shown in FIG. 1, the electronic device 102 comprises a processor 108, a memory 110 coupled to the processor 108 and interface(s) 112. The processor 108 may be implemented as one or more microprocessors, microcomputers, microcontrollers, digital signal processors, central processing units, state machines, logic circuitries, and/or any devices that manipulate signals based on operational instructions. Among other capabilities, the processor 108 is configured to fetch and execute computer-readable instructions stored in the memory 110. The memory 110 can include any non-transitory computer-readable medium known in the art including, for example, volatile memory (e.g., RAM), and/or non-volatile memory (e.g., EPROM, flash memory, etc.).

The interface(s) 112 may include a variety of software and hardware interfaces, for example, a web interface, a graphical user interface, etc., allowing the electronic device 102 to interact with user devices. Further, the interface(s) 112 may enable the electronic device 102 to communicate with other computing devices. The interface(s) 112 can facilitate multiple communications within a wide variety of networks and protocol types, including wired networks, for example LAN, cable, etc., and wireless networks such as WLAN, cellular, or satellite. The interface(s) 112 may include one or more ports for connecting a number of devices to each other or to another server.

In one example, the electronic device 102 includes modules 114 and data 116. In one embodiment, the modules 114 and the data 116 may be stored within the memory 110. In one example, the modules 114, amongst other things, include routines, programs, objects, components, and data structures, which perform particular tasks or implement particular abstract datatypes.

In one implementation, the modules 114 include a receiving module 118, a segmentation module 120, a relationship module 122, a reading sequence module 124, an audio generation module 126. In an example, the modules 114, may also comprise other modules 128. The other modules 128 may perform various miscellaneous functionalities of the electronic device 102. It will be appreciated that such aforementioned modules may be represented as a single module or a combination of different modules.

In one example, the data 116 serves, among other things, as a repository for storing data fetched, processed, received and generated by one or more of the modules 114. In one implementation, the data 116 may include metadata of characters 130, metadata of line segments 132, spatial information of segments 134. In one embodiment, the data 116 may be stored in the memory 110 in the form of various data structures. In an example, the data 116 may also comprise other data 136 including temporary data and temporary files, generated by the modules 114 for performing the various functions of the electronic device 102.

In order to convert text of an electronic document to speech, based on the reading sequence of the electronic document, the electronic device 102 may receive the electronic document from the document database 104 by the receiving module 118. The electronic document may comprise one or more pages. Pages may comprise plurality of characters and plurality of line segments.

After receiving the electronic document, characters in the pages of the electronic document may be segmented into a plurality of segments, by the segmentation module 120. In one embodiment, the plurality of segments may be a plurality of rectangles. In one embodiment, characters whose spacing difference is less than twice the width of each of the characters, is segmented into rectangles. Each rectangle comprises a vertical edge and a horizontal edge. The vertical edge is the leftmost edge of the rectangle and the horizontal edge is the bottommost edge of the rectangle.

After segmenting the characters into rectangles, the relationship between each of the rectangles is identified, by the relationship module 122. More specifically identifying the relationship includes identifying the relation between each of the horizontal edges of the rectangles. Identifying the relationship further includes identifying the relationship between each of the vertical edges of the rectangles. The relationship between the rectangles is identified based on the metadata of characters 130, the metadata of line segments 132 and the spatial information of segments 134. The metadata may include top distance that is calculated from top edge of a page in the electronic document, left distance that is calculated from left edge of the page, height, width and font size. In one embodiment, the metadata of characters 130, the metadata of line segments 132 may be received from an electronic document reader, by the receiving module 118. An illustration for the electronic document reader may be a Portable Document Format reader, such as Adobe™ Acrobat™ Reader™.

The spatial information 134 may include alignment data that is associated with the horizontal and vertical edges of the rectangles. The alignment data may include a vertical edge alignment data and a horizontal edge alignment data. The vertical edge alignment data may include positional information of each of the vertical edges of the rectangles. The horizontal edge alignment data may include positional information of each of the horizontal edges of the rectangles. In one embodiment, the positional information may be represented in coordinates. In one illustration, the positional information of the vertical edge of a rectangle may be (10,10), (10,20). In the same illustration, the positional information of the horizontal edge of the rectangle may be (10,10) and (40,10). In one embodiment, the spatial information 134 may further include height and width of the rectangle.

In one embodiment, the positional information may be derived from the metadata of the characters 130. For instance, the positional information of the vertical edge may be determined from the metadata of the first character of the rectangle. The height of the rectangle may be the same as height of the largest character in the rectangle and can be identified from the metadata of the largest character in the rectangle. The width of the rectangle may be determined from sum of the width of all the characters in the rectangle. The positional information of the horizontal edge may be determined from the metadata of the first character of the rectangle and the width of the rectangle.

The application identifies 5 relationships between the rectangles. They are "paragraph related", "not paragraph related", "table row related", "table column related" and "consecutively related".

When consecutive horizontal edges of rectangles are proximate to each other, then, the identified relationship between the horizontal edges is "paragraph related". Similarly, consecutive vertical edges may be "paragraph related" when the vertical edges are proximate to each other. In one embodiment, a rule may be defined to identify proximity between edges. For instance, in one illustration, the rule may be that when the horizontal edges have a distance of one character width between them, then the horizontal edges may be considered as proximate, and hence "paragraph related".

When the consecutive horizontal edges are not proximate to each other, then the identified relationship between the horizontal edges is "not paragraph related". Similarly, the consecutive vertical edges may be "not paragraph related" when the vertical edges are not proximate to each other. When the consecutive horizontal edges are edges of consecutive rows of a table, then the relationship between the horizontal edges are considered to be "table row related". Similarly, when the consecutive vertical edges are edges of consecutive columns of a table, then the relationship between the vertical edges are considered to be "table column related". The edges of the rectangles may also be related by "consecutively related", which will be explained in further detail in the following paragraphs.

The relationship between the rectangles is determined using machine learning. The model used for the machine learning is a Conditional Random Field (CRF) Sequential Labeling Model. Initially learning model is taught by supplying training data. The training data may be pages in the electronic document and relationships between edges of the rectangles. The observations for the CRF sequential labeling model are the rectangles. A plurality of features is derived from the observations and these features are given as input to the labeling model. When a new page is provided to the learning model, the learning model tries to label the relationship between edges based on the features. These features may include single edge feature and double edge feature. In one embodiment, the single edge feature may include features for the horizontal edge and the vertical edge.

In one illustration, the features of the vertical edge may include distance between the rectangles, distance between center alignments, percentage of numbers in the rectangle, left alignment distance of the rectangle, right alignment distance of the rectangle, height difference between the rectangles and whether the vertical edge passes through a line segment. The distance between two rectangles may give an indication of whether the rectangles are "paragraph related". Similarly, the distance between center alignments may indicate whether the rectangles are "paragraph related". If the distance between the center alignments is more than a pre-defined threshold, then this may indicate that the rectangles may be "not paragraph related". Similarly, when the left alignment distance and the right alignment distance is beyond a pre-defined threshold, then this may indicate that the rectangles are "not paragraph related". The percentage of numbers in the rectangle may indicate that the rectangle is a part of table. When the height difference between the rectangles is beyond a pre-defined threshold, then this may indicate that the rectangles are "not paragraph related". When the vertical edge of the rectangle passes through the line segment, this may indicate that the rectangle is part of a table. The line segment may indicate an underline.

In one embodiment, the double edge feature may include the probability distribution of relationship between consecutive vertical edges and consecutive horizontal edges. In one illustration, rect 1 may be a referential rectangle. There may be a rect 2 to the right side of the rect 1 and a rect 3 below rect 1. The probability distribution gives the probability of vertical edges of rect 1 and rect 2 being "table column related" and horizontal edges of rect 1 and rect 3 being "table row related". In the same illustration, when the probability of vertical edges of rect 1 and rect 2 being "paragraph related" is high, then the probability of horizontal edges of rect 1 and rect 3 being "paragraph related" may be low.

In one embodiment, the relationship between the rectangles may be visually represented using a relationship graph. The relationship graph may include the rectangles and the relationship between the rectangles. In this embodiment, the training data given to the learning model for training the machine to label the edges may be the relationship graph. In the same embodiment, when a new page of an electronic document is provided to the learning model, then the learning model may provide the relationship graph of the page.

After identifying the relationship between each of the segments, a reading sequence of the electronic document may be determined. The reading sequence may be determined from the relationship. For instance, the paragraph related rectangles may be read together. Similarly, the table column related rectangles may be read together. "Consecutively related" is a relation that identifies the next rectangle that needs to be read. The relevance of the relation, "consecutively related", arises at the last rectangle of the paragraph. This rectangle may not be "paragraph related" to the consecutive rectangle, yet they may be "consecutively related". Meaning that, after reading the last rectangle of the paragraph, the machine will read the next rectangle that is consecutively related to the last rectangle.

Few of the features that help in identifying the "consecutively related" relation is font size and presence of line segment. In one illustration, title in a page may be of a different size in comparison with the content following the title. The learning model may intuit a consecutive relation between the rectangle encompassing the title and the rectangle containing the content following the title. This is true even though these rectangles are not "paragraph related". In one illustration, the presence of a line segment may be used to delineate two rectangles that might not be paragraph related but might be related consecutively. The line segment may indicate an underline.

After determining the reading sequence, an audio that is based on the reading sequence of the electronic document may be generated. The text in the order of the reading sequence may be provided to the text to speech converter 106. The text to speech converter 106 may convert the ordered text to an audio and provide the audio to a user.

The default reading sequence that has been considered for this patent application is top-down and left-right reading sequence.

Figure 2:
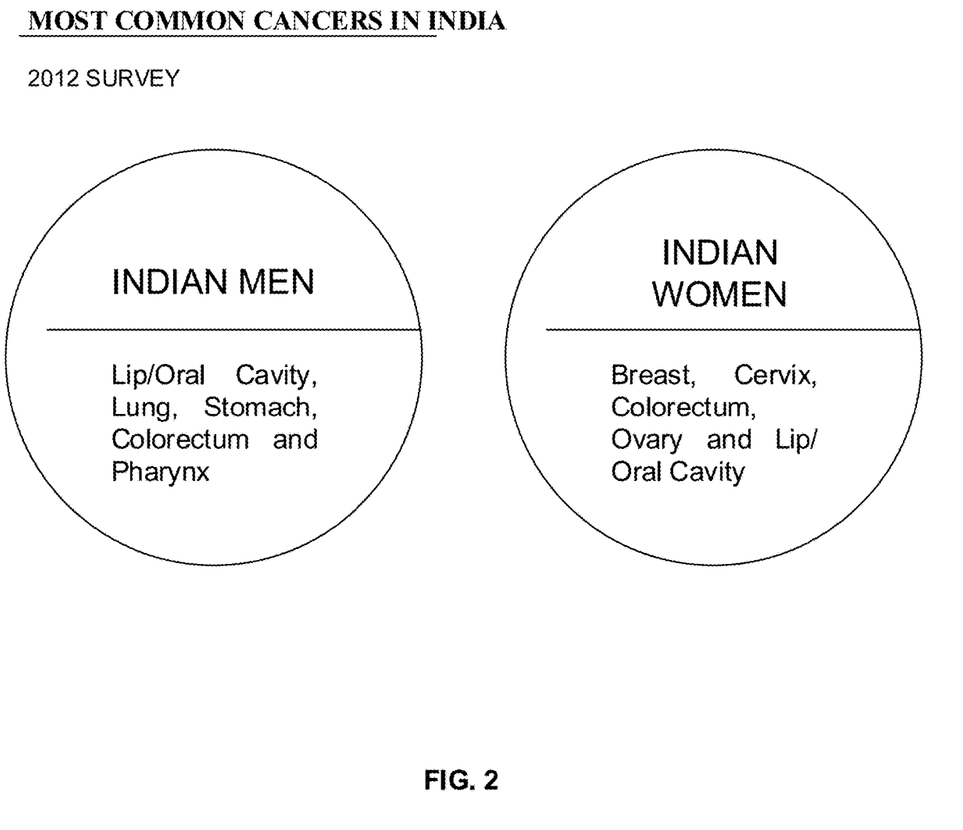
FIG. 2 is an illustrative page of an electronic document that needs to be converted to a relationship graph, wherein the relationship graph reveals the relationship between segments in the electronic document, according to some embodiments of the present disclosure.

FIG. 2 is an illustrative page of an electronic document that needs to be converted to a relationship graph, wherein the relationship graph reveals the relationship between rectangles in the electronic document.

Figure 3:
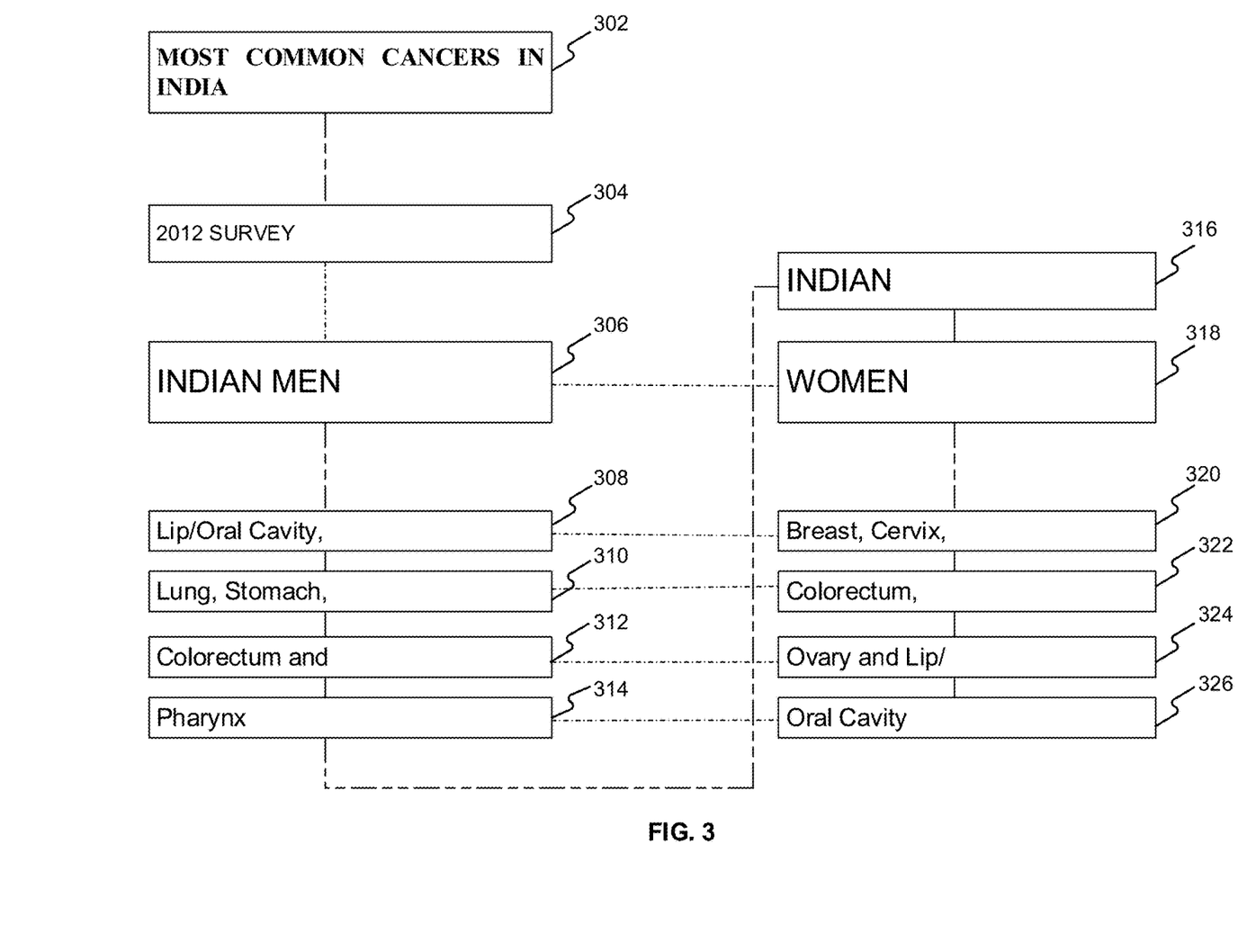
FIG. 3 illustrates a relationship graph corresponding to an illustrative page of an electronic document in FIG. 2, in accordance with some embodiments of the present disclosure.

FIG. 3 illustrates a relationship graph corresponding to an illustrative page of an electronic document indicated in FIG. 2. The solid line connecting the rectangles indicate that the relationship between the rectangles is "paragraph related". The long dash short dash short dash line indicates that the rectangles are "consecutively related". The half dash dot line indicates that the rectangles are "not paragraph related".

Referring back to FIG. 2, the content "most common cancers in India" and "2012 survey" are both left aligned. In this illustration, the left alignment distance (that is the distance between the left alignment of the rectangles) is zero. Further, there is a line segment that delineates the two contents, perhaps indicating an underline Furthermore, there is a difference between the font size of the two contents. Returning to FIG. 3, the learning model intuit from these features that the rectangles that encompasses the two contents are "not paragraph related" yet they are "consecutively related". This means that the reading sequence will be such that the machine reads "2012 survey" immediately after reading "most common cancers in India".

Since the learning model was not able to intuit the relationship between the rectangle that contains "2012 survey" and the rectangle that contains "Indian men", the reading sequence will be the default reading sequence. That is top-bottom and left-right reading sequence. Hence, the machine will read "Indian men" after "2012 survey".

Referring back to FIG. 2, the content "Indian men" and "lip/oral cavity," are both centrally aligned. Also, there is a line segment that delineates "Indian men" and "lip/oral cavity,", perhaps indicating an underline. Further there is a difference in font size between the contents. Furthermore, the two contents seem to be grouped together via a circle. Returning to FIG. 3, the learning model will thus intuit that the rectangles that encompasses the contents "Indian men" and "lip/oral cavity," may not be "paragraph related" but the contents may be "consecutively related".

TABLE 1

| Vertical edges | Horizontal edges | Paragraph related | Consecutive related |
|---|---|---|---|
| $V_{302}$ and $V_{304}$ | $H_{302}$ and $H_{304}$ | No | Yes |
| $V_{304}$ and $V_{306}$ | $H_{304}$ and $H_{306}$ | No | Default |
| $V_{306}$ and $V_{308}$ | $H_{306}$ and $H_{308}$ | No | Yes |
| $V_{308}$ and $V_{310}$ | $H_{308}$ and $H_{310}$ | Yes | Yes |
| $V_{310}$ and $V_{312}$ | $H_{310}$ and $H_{312}$ | Yes | Yes |
| $V_{312}$ and $V_{314}$ | $H_{312}$ and $H_{314}$ | Yes | Yes |
| $V_{314}$ and $V_{316}$ | $H_{314}$ and $H_{316}$ | No | Yes |
| $V_{316}$ and $V_{318}$ | $H_{316}$ and $H_{318}$ | Yes | Yes |
| $V_{318}$ and $V_{320}$ | $H_{318}$ and $H_{320}$ | No | Yes |
| $V_{320}$ and $V_{322}$ | $H_{320}$ and $H_{322}$ | Yes | Yes |
| $V_{322}$ and $V_{324}$ | $H_{322}$ and $H_{324}$ | Yes | Yes |
| $V_{324}$ and $V_{326}$ | $H_{324}$ and $H_{326}$ | Yes | Yes |
| $V_{306}$ and $V_{318}$ | $H_{306}$ and $H_{318}$ | No | No |
| $V_{308}$ and $V_{320}$ | $H_{308}$ and $H_{320}$ | No | No |
| $V_{310}$ and $V_{322}$ | $H_{310}$ and $H_{322}$ | No | No |
| $V_{312}$ and $V_{324}$ | $H_{312}$ and $H_{324}$ | No | No |
| $V_{314}$ and $V_{326}$ | $H_{314}$ and $H_{326}$ | No | No |

Table. 1 indicates the relationship between consecutive vertical edges and consecutive horizontal edges. $V_{302}$, $V_{304}$, $V_{306}$, $V_{308}$, $V_{310}$, $V_{312}$, $V_{314}$, $V_{316}$, $V_{318}$, $V_{320}$, $V_{322}$, $V_{324}$ and $V_{326}$ (not shown in FIG. 3) are the vertical edges and $H_{302}$, $H_{304}$, $H_{306}$, $H_{308}$, $H_{310}$, $H_{312}$, $H_{314}$, $H_{316}$, $H_{318}$, $H_{320}$, $H_{322}$, $H_{324}$ and $H_{326}$ (not shown in FIG. 3) are the horizontal edges of the rectangles (302, 304, 306, 308, 310, 312, 314, 316, 318, 320, 322, 324 and 326) respectively.

For $V_{302}$ and $V_{304}$ and $V_{306}$ and $V_{308}$ the vertical edges are "not paragraph related", yet the contents are read one after the other because they are "consecutively related". $V_{304}$ and $V_{306}$ are "not paragraph related", but since the learning model was not able to identify the consecutive relationship, the default reading sequence is adopted. For $V_{306}$ and $V_{318}$, $V_{308}$ and $V_{320}$, $V_{310}$ and $V_{322}$, $V_{312}$ and $V_{324}$ and $V_{314}$ and $V_{326}$, the vertical edges are neither "paragraph related", nor are they "consecutively related", hence they will not be read together. For paragraphs, all the rectangles except the last rectangle of the paragraph may be "paragraph related" and "consecutively related". This might not be true for the last rectangle in the paragraph. Hence, $V_{308}$ and $V_{310}$, $V_{310}$ and $V_{312}$ and $V_{312}$ and $V_{314}$ are both "paragraph related" and "consecutively related". For $V_{314}$ and $V_{316}$, they are "not paragraph related", yet they are "consecutively related". This may be because $V_{314}$ is the vertical edge of the last rectangle of the paragraph.

Figure 4:
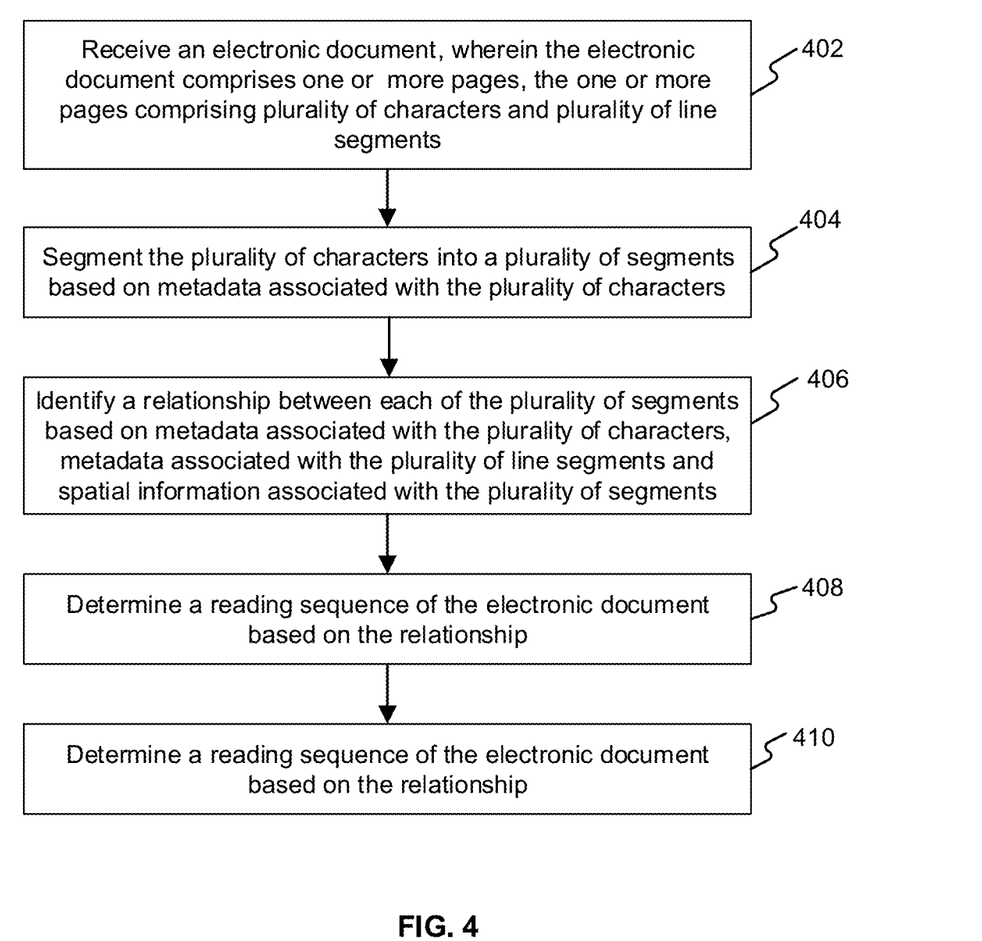
FIG. 4 is a flow diagram illustrating a method of text to speech conversion of an electronic document in accordance with some embodiments of the present disclosure.

FIG. 4 is a flow diagram illustrating a method of text to speech conversion of an electronic document. With reference to FIG. 4, an electronic document may be received, at step 402. The electronic document may comprise one or more pages. Each of the pages may further comprise plurality of characters and plurality of line segments.

After receiving the electronic document, characters in each of the pages may be segmented into a plurality of segments, at step 404. In one embodiment, the plurality of segments may be a plurality of rectangles. The characters whose spacing difference is less than twice the width of each of the characters may be segmented into rectangles. Each rectangle comprises a vertical edge and a horizontal edge. The vertical edge is the leftmost edge of the rectangle and the horizontal edge is the bottommost edge of the rectangle.

After segmenting the characters into rectangles, the relationship between each of the rectangles is identified, at step 406. Identifying the relationship may include identifying relationship between each of the horizontal edges and further identifying the relationship between each of the vertical edges of the rectangles. The relationship between the rectangles is identified based on the metadata of characters 130, the metadata of line segments 132 and the spatial information of segments 134. The metadata may include top distance that is calculated from top edge of a page in the electronic document, left distance that is calculated from left edge of the page, height, width and font size. In one embodiment, the metadata of characters 130 and the metadata of line segments 132 may be received from an electronic document reader. An illustration for the electronic document reader may be a Portable Document Format reader, such as Adobe™ Acrobat™ Reader™.

The spatial information 134 may include alignment data that is associated with the horizontal and vertical edges of the rectangles. The alignment data may include a vertical edge alignment data and a horizontal edge alignment data. The vertical edge alignment data may include positional information of each of the vertical edges of the rectangles. The horizontal edge alignment data may include positional information of each of the horizontal edges of the rectangles. In one embodiment, the positional information may be represented in coordinates. For instance, the positional information of the vertical edge of a rectangle may be (10,10), (10,20). In the same illustration, the positional information of the horizontal edge of the rectangle may be (10,10) and (40,10). In one embodiment, the spatial information 134 may further include height and width of the rectangle.

In one embodiment, the positional information may be derived from the metadata of the characters 130. For instance, the positional information of the vertical edges may be determined from the metadata of the first character of the rectangle. The height of the rectangle may be the same as height of the largest character in the rectangle and can be identified from the metadata of the largest character in the rectangle. The width of the rectangle may be determined from sum of the width of all the characters in the rectangle. The positional information of the horizontal edges may be determined from the metadata of the first character of the rectangle and the width of the rectangle.

The application identifies 5 relationships between the rectangles. They are "paragraph related", "not paragraph related", "table row related", "table column related" and "consecutively related".

When consecutive horizontal edges of rectangles are proximate to each other, then, the identified relationship between the horizontal edges is "paragraph related". Similarly, consecutive vertical edges may be "paragraph related" when the vertical edges are proximate to each other. In one embodiment, a rule may be defined to identify proximity between edges. For instance, in one illustration, the rule may be that when the horizontal edges have a distance of one character width between them, then the horizontal edges may be considered as proximate, and hence paragraph related.

When the consecutive horizontal edges are not proximate to each other, then the identified relationship between the horizontal edges is "not paragraph related". Similarly, the consecutive vertical edges may be "not paragraph related" when the vertical edges are not proximate to each other. When the consecutive horizontal edges are edges of consecutive rows of a table, then the relationship between the horizontal edges are considered to be "table row related". Similarly, when the consecutive vertical edges are edges of consecutive columns of a table, then the relationship between the vertical edges are considered to be "table column related". The edges of the rectangles may also be related by "consecutively related", which will be explained in further detail in the following paragraphs.

The relationship between each of the edges of the rectangles is determined using machine learning. The model used for the machine learning is a Conditional Random Field (CRF) Sequential Labeling Model. Initially the learning model is taught by supplying training data. The training data may be pages in the electronic document and relationships between edges of the rectangles. The observations for the CRF sequential labeling model are the rectangles. A plurality of features is derived from the observations and these features are given as input to the labeling model. When a new page is provided to the learning model, the learning model tries to label the relationship between edges based on the features. These features may include single edge feature and double edge feature. In one embodiment, the single edge feature may include features for the horizontal edges and the vertical edges.

In one illustration, the features of the vertical edge may include distance between the rectangles, distance between center alignments, percentage of numbers in the rectangle, left alignment distance of the rectangle, right alignment distance of the rectangle, height difference between the rectangles and whether the vertical edge passes through a line segment. The distance between two rectangles may give an indication of whether the rectangles are "paragraph related". Similarly, the distance between center alignments may indicate whether the rectangles are "paragraph related". If the distance between the center alignments is more than a pre-defined threshold, then this may indicate that the rectangles may be "not paragraph related". Similarly, when the left alignment distance and the right alignment distance is beyond a pre-defined threshold, then this may indicate that the rectangles are "not paragraph related". The percentage of numbers in the rectangle may indicate that the rectangle is a part of table. When the height difference between the rectangles is beyond a pre-defined threshold, then this may indicate that the rectangles are "not paragraph related". When the vertical edge of the rectangle passes through the line segment, this may indicate that the rectangle is part of a table. Another feature may be font size which may help in identifying "consecutively related" rectangles. This is further explained in conjunction with FIG. 3.

In one embodiment, the double edge feature may include the probability distribution of relationship between consecutive vertical edges and consecutive horizontal edges. In one illustration, rect 1 may be a referential rectangle. There may be a rect 2 to the right side of the rect 1 and a rect 3 below rect 1. The probability distribution gives the probability of vertical edges of rect 1 and rect 2 being "table column related" and horizontal edges of rect 1 and rect 3 being "table row related". In the same illustration, when the probability of vertical edges of rect 1 and rect 2 being "paragraph related" is high, then the probability of horizontal edges of rect 1 and rect 3 being "paragraph related" may be low.

In one embodiment, the relationship between the rectangles may be visually represented using a relationship graph. The relationship graph may include the rectangles and the relationship between the rectangles. In this embodiment, the training data provided to the learning model for training the machine to label the edges may be the relationship graph. In the same embodiment, when a new page of an electronic document is provided to the learning model, then the learning model may provide as output the relationship graph of the new page.

After identifying the relationship between each of the segments, a reading sequence of the electronic document may be determined, at step 408. The reading sequence may be determined from the relationship. For instance, the "paragraph related" rectangles may be read together. Similarly, the "table column related" rectangles may be read together. "Consecutively related" is a relation that identifies the next rectangle that needs to be read. The relevance of the relation, "consecutively related", arises at the last rectangle of the paragraph. This rectangle may not be "paragraph related" to the consecutive rectangle, yet they may be "consecutively related". Meaning that, after reading the last rectangle of the paragraph, the machine will read the next rectangle that is consecutively related to the last rectangle.

Few of the features that help in identifying the "consecutively related" relation is font size and presence of line segment. In one illustration, title in a page may be of a different font size in comparison with the font size of the content following the title. The learning model may intuit a consecutive relation between the rectangle encompassing the title and the rectangle containing the content following the title. This is true even though these rectangles are "not paragraph related". In one illustration, the presence of a line segment may be used to delineate two rectangles that might not be paragraph related but might be related consecutively. The line segment may indicate an underline.

After determining the reading sequence, an audio that is based on the reading sequence of the electronic document may be generated, at step 410. The text in the order of the reading sequence may be provided to a text to speech converter 106. The text to speech converter 106 may convert the ordered text to an audio and provide the audio to a user.

Computer System

Figure 5:
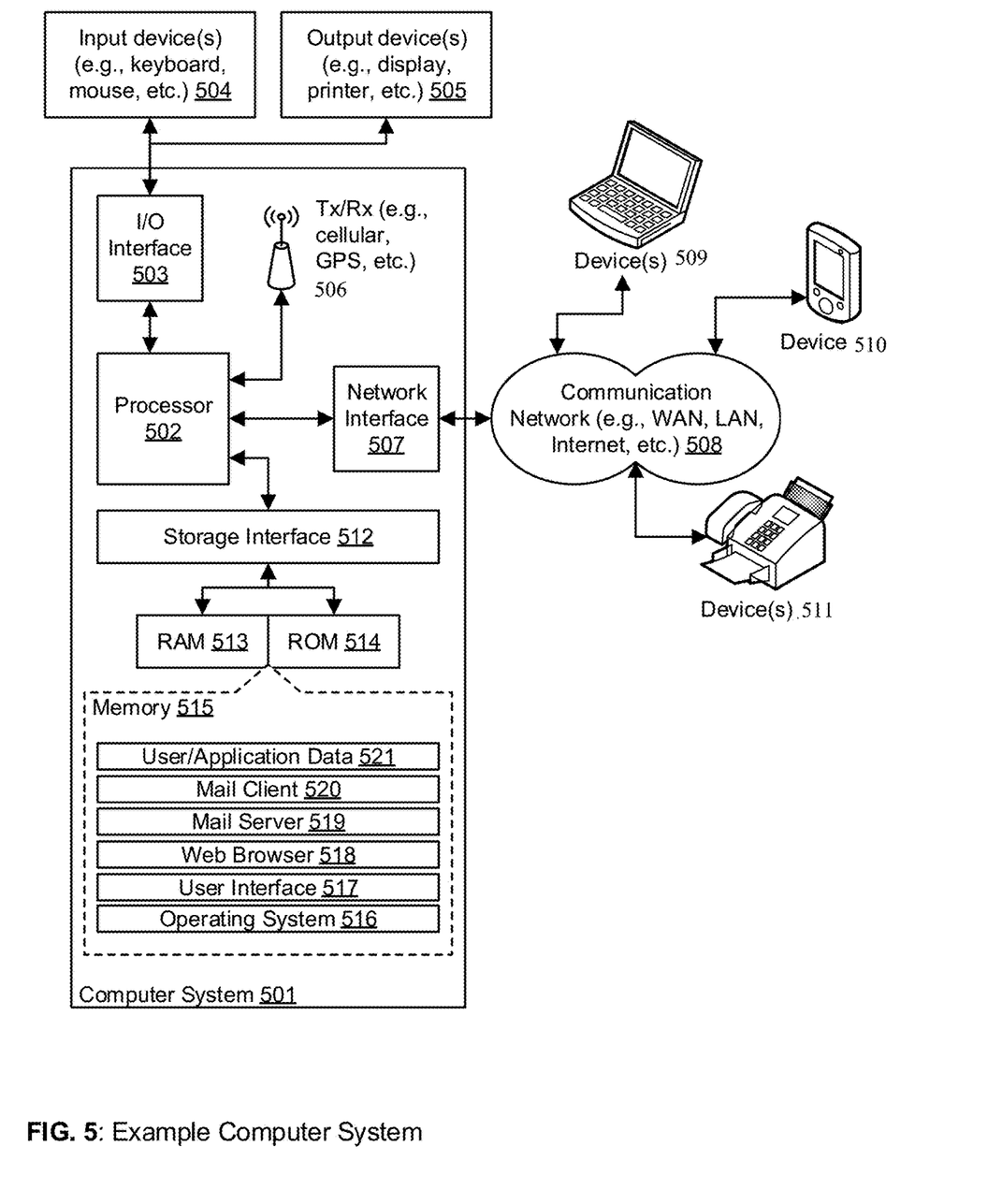
FIG. 5 is a block diagram of an exemplary computer system for implementing embodiments consistent with the present disclosure.

FIG. 5 is a block diagram of an exemplary computer system for implementing embodiments consistent with the present disclosure. Variations of computer system 501 may be used for implementing the electronic device. Computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 510, 511, and 512. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described application title. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of text-to-speech conversion of electronic documents, the method comprising:
    receiving, by an electronic device, an electronic document comprising one or more pages comprising a plurality of characters and a plurality of first segments;
    segmenting, by the electronic device, the plurality of characters into a plurality of second segments based on first metadata associated with the plurality of characters, wherein the plurality of second segments comprises plurality of rectangles, and wherein characters of the plurality of characters whose spacing difference is less than twice a width of each of the characters, is segmented into rectangles;
    identifying, by the electronic device, a first relationship between each of the plurality of second segments based on the first metadata associated with the plurality of characters, second metadata associated with the plurality of first segments and spatial information associated with the plurality of segments, wherein the first relationship is identified using a conditional random field sequential labeling model, wherein the conditional random field sequential labeling model is created and trained to identify the first relationship using training data, wherein the training data comprises one or more pages in an electronic document and one or more relationships between edges of the rectangles, wherein a plurality of features are derived from the rectangles and are provided as input to the conditional random field sequential labeling model during training;
    determining, by the electronic device, a reading sequence of the electronic document based on the first relationship; and
    generating, by the electronic device, an audio based on the reading sequence of the electronic document.

2. The method as claimed in claim 1, wherein the spatial information comprises alignment data associated with vertical edges and horizontal edges of the plurality of rectangles.

3. The method as claimed in claim 1, wherein each of the plurality of rectangles comprises a vertical edge and a horizontal edge and the method further comprises:
identifying, by the electronic device, a second relationship between each of the horizontal edges associated with the plurality of rectangles; and
identifying, by the electronic device, a third relationship between each of the vertical edges associated with the plurality of rectangles.

4. The method as claimed in claim 1, further comprising:
grouping, by the electronic device, the plurality of rectangles whose horizontal edges are related based on the spatial information; and
grouping, by the electronic device, the plurality of rectangles whose vertical edges are related based on the spatial information.

5. An electronic device, comprising a processor a memory communicatively coupled to the processor, wherein the memory comprises processor-executable instructions stored thereon, which when executed by the processor, cause the processor to:
receive an electronic document comprising one or more pages comprising a plurality of characters and a plurality of first segments;
segment the plurality of characters into a plurality of second segments based on first metadata associated with the plurality of characters, wherein the plurality of second segments comprises plurality of rectangles, and wherein characters of the plurality of characters whose spacing difference is less than twice a width of each of the characters, is segmented into rectangles;
identify a first relationship between each of the plurality of second segments based on the first metadata associated with the plurality of characters, second metadata associated with the plurality of first segments and spatial information associated with the plurality of segments, wherein the first relationship is identified using a conditional random field sequential labeling model, wherein the conditional random field sequential labeling model is created and trained to identify the first relationship using training data, wherein the training data comprises one or more pages in an electronic document and one or more relationships between edges of the rectangles, wherein a plurality of features are derived from the rectangles and are provided as input to the conditional random field sequential labeling model during training;
determine a reading sequence of the electronic document based on the first relationship; and
generate an audio based on the reading sequence of the electronic document.

6. The electronic device as claimed in claim 5, wherein the spatial information comprises alignment data associated with vertical edges and horizontal edges of the plurality of rectangles.

7. The electronic device as claimed in claim 5, wherein each of the plurality of rectangles comprises a vertical edge and a horizontal edge and the processor-executable instructions, when executed by the processor, further cause the processor to:
identify a second relationship between each of the horizontal edges associated with the plurality of rectangles; and
identify a third relationship between each of the vertical edges associated with the plurality of rectangles.

8. The electronic device as claimed in claim 5, wherein the processor-executable instructions, when executed by the processor, further cause the processor to:
group the plurality of rectangles whose horizontal edges are related based on the spatial information; and
group the plurality of rectangles whose vertical edges are related based on the spatial information.

9. A non-transitory computer readable medium having stored thereon instructions for text-to-speech conversion of electronic documents comprising executable code which when executed by one or more processors, causes the one or more processors to:
receive an electronic document comprising one or more pages comprising a plurality of characters and a plurality of first segments;
segment the plurality of characters into a plurality of second segments based on first metadata associated with the plurality of characters, wherein the plurality of second segments comprises plurality of rectangles, and wherein characters of the plurality of characters whose spacing difference is less than twice a width of each of the characters, is segmented into rectangles;
identify a first relationship between each of the plurality of second segments based on the first metadata associated with the plurality of characters, second metadata associated with the plurality of first segments and spatial information associated with the plurality of segments, wherein the first relationship is identified using a conditional random field sequential labeling model, wherein the conditional random field sequential labeling model is created and trained to identify the first relationship using training data, wherein the training data comprises one or more pages in an electronic document and one or more relationships between edges of the rectangles, wherein a plurality of features are derived from the rectangles and are provided as input to the conditional random field sequential labeling model during training;
determine a reading sequence of the electronic document based on the first relationship; and
generate an audio based on the reading sequence of the electronic document.

10. The non-transitory computer readable medium as claimed in claim 9, wherein the spatial information comprises alignment data associated with vertical edges and horizontal edges of the plurality of rectangles.

11. The non-transitory computer readable medium as claimed in claim 9, wherein each of the plurality of rectangles comprises a vertical edge and a horizontal edge and the executable code when executed by the one or more processors further causes the one or more processors to:
identify a second relationship between each of the horizontal edges associated with the plurality of rectangles; and
identify a third relationship between each of the vertical edges associated with the plurality of rectangles.

12. The non-transitory computer readable medium as claimed in claim 9, wherein the executable code when executed by the one or more processors further causes the one or more processors to:
group the plurality of rectangles whose horizontal edges are related based on the spatial information; and group the plurality of rectangles whose vertical edges are related based on the spatial information.

\* \* \* \* \*